Feb. 14, 1939.   J. NEUFELD   2,147,170
ELECTRIC TRANSLATING SYSTEM
Filed Jan. 8, 1937

INVENTOR
Jacob Neufeld
BY
ATTORNEY

Patented Feb. 14, 1939

2,147,170

UNITED STATES PATENT OFFICE 2,147,170

ELECTRIC TRANSLATING SYSTEM

Jacob Neufeld, Tulsa, Okla.

Application January 8, 1937, Serial No. 119,577

5 Claims. (Cl. 175—363)

This invention relates to electric translating systems and more particularly to such systems including transformer apparatus for transmitting energy between a pair of electric translating circuits, the transforming apparatus being provided with a winding system comprising multiple polyphase networks operating in parallel. While the invention has general use and application it is particularly suitable for transmitting energy between a polyphase alternating current circuit and a direct current circuit through an electric valve rectifier or rectifier system.

It is well known in the art, when transmitting energy from an alternating current supply circuit to a direct current load circuit through an electric valve rectifier, such for example, as a mercury arc rectifier, the voltage regulation of the system and the wave form in both the alternating and direct current circuits are improved and the inductive interference decreased by increasing the equivalent number of phases of the secondary windings of the transformer in any of the several well known manners. If the primary windings of such transformer are connected in mesh or ring and the electrical neutrals of the secondary windings are directly coupled together, each of the several anode paths in the rectifier is active for only 1/nth of the cycle where $n$ is the equivalent number of phases of the secondary windings.

In order to secure a better utilization of the rectifier apparatus, however, it is desirable to have several anodes active simultaneously. It has been found possible to secure this result by forming the secondary windings of the transformers into a plurality of independent polyphase networks and interconnecting these multiple networks through mid-tapped reactors known as interphase transformers. One particularly effective manner of securing an increase in the equivalent number of phases of the secondary winding of the transformer is to connect each of the several multiple secondary networks in star, each leg of the star being composed of a winding from two or more of the primary phases. In the use of this general type of transformer connection, which is known in the art as a zig-zag connection, there has been some difficulty experienced in securing an equal division of load between the multiple secondary networks. On the other hand any substantial unbalance in load between the multiple secondary networks lowers the efficiency of the transforming apparatus, decreases its rating and, when used in connection with rectifying apparatus, increases the susceptibility to arc backs and other disturbances in the system.

Accordingly, it is an object of my invention therefore, to provide an improved electric translating system for transmitting energy between a pair of electric translating circuits by means of transforming apparatus having a winding system comprising multiple polyphase networks operating in parallel, which will overcome the above mentioned disadvantages of the arrangements of the prior art, and which will be simple, reliable and economical in operation.

Another object of the invention is to provide an improved electric translating system for transmitting energy between a pair of electric translating circuits by means of transforming apparatus having a winding system comprising a plurality of multiple polyphase networks, by means of which an equal division of load between the multiple secondary networks may be insured.

A further object of my invention is the provision of an improved rectifying system for transmitting energy from an alternating current circuit and including transforming apparatus having a winding system comprising multiple polyphase networks, in which the efficiency and rating of the apparatus may be increased and its freedom from arc backs improved.

For a better understanding of the invention together with other and further objects thereof, reference is had to the following descriptions taken in connection with the accompanying drawing illustrating by way of example an energy translating system embodying the improvements of the invention.

Referring to the drawing.

Figure 1:
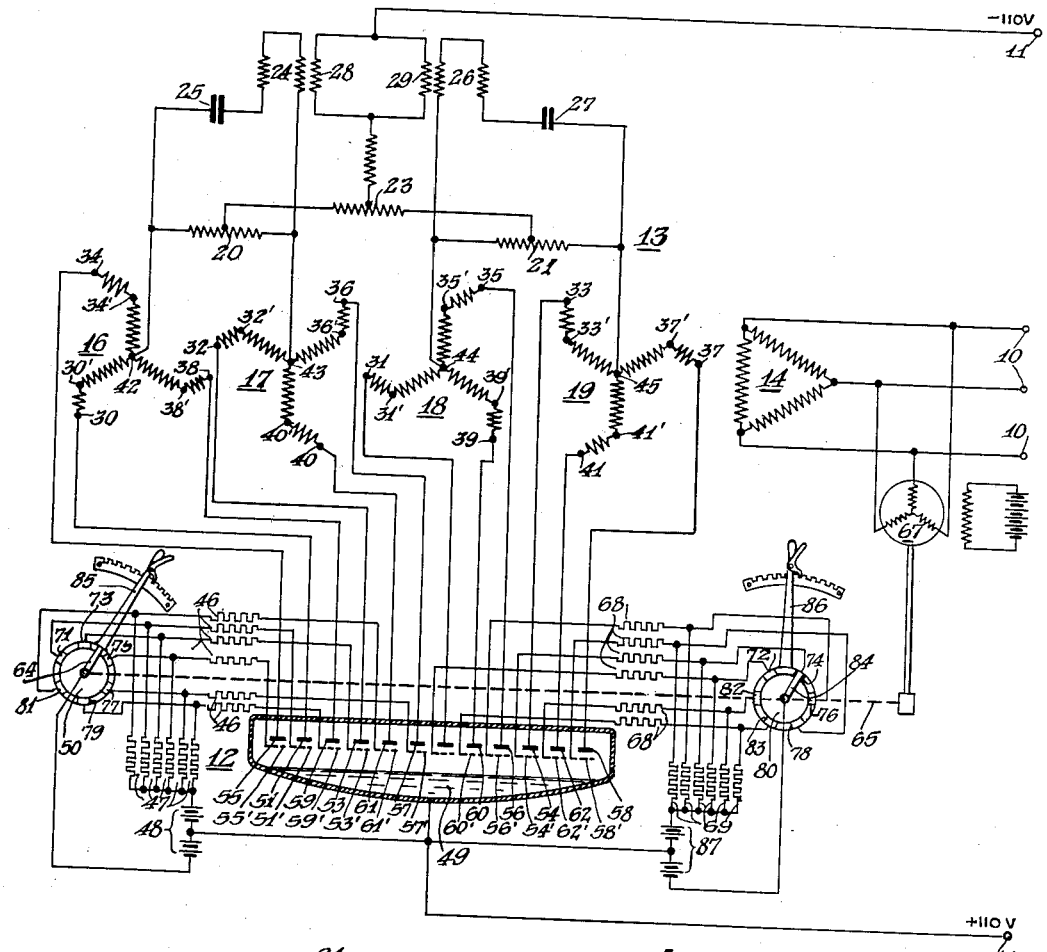
Figure 1 is a diagram illustrating a rectifying system embodying the invention for transmitting energy from a three phase alternating current supply circuit to a direct current load circuit.

Referring more particularly to Figure 1, the rectifier system includes alternating current supply terminals 10 and direct current terminals 11 between which power is transmitted through an electric discharge apparatus such as rectifier 12 and a main transformer apparatus 13. The alternating current circuit may be a three-phase system as shown and the direct current circuit may be of the standard 110 volt type without being limited thereto. The transformer apparatus 13 as shown has a single primary winding 14 and four star connected secondary windings 16, 17, 18 and 19. The neutral terminals of the secondary windings 16 and 17 are interconnected through an interphase transformer 20 and the neutral terminals of the secondary windings 18 and 19 are likewise interconnected through an interphase transformer 21. Connected between the interphase transformers 20 and 21 is a winding 23 or third interphase transformer provided with a midterminal which is connected to the negative side of the direct current circuit. The third interphase transformer is preferably provided with an air gap and arranged so that considerable leakage is present in the magnetic circuit.

The transformer windings 16 and 17 form in effect a 6-phase system. The interphase connection of this system includes the interphase transformer 20 shunted by a reactor 24 and a condenser 25. The interphase connection of the 6-phase system formed by the windings 18 and 19 includes the interphase transformer 21 shunted by a reactor 26 and a condenser 27. The reactors 24 and 26 are provided, respectively, with D. C. windings 28 and 29 which are connected in series with the load circuit of the rectifier. As the saturation in the reactors 24 and 26 varies due to the effect of windings 28 and 29 the reactance in the compounding circuits comprising these reactors also varies, thus varying in turn the compounding effect in the system and with it the rectifier voltage.

As previously explained the effect of the reactive voltage in the main transformer 13 is to cause the 6-phase system including the windings 16 and 17 to take more load than the 6-phase system including the windings 18 and 19 when the phase rotation of the transformer 13 is in one direction and to cause the 6-phase system including the windings 18 and 19 to take more load than the 6-phase system including the windings 16 and 17 when the phase rotation of the transformer is in the other direction.

The phase terminals 30 to 41 of secondaries 16 to 19 are connected respectively to the anodes of rectifier 12 which fire or start to carry current in the order determined by the sequence of numerals 30 to 41 representing these phase terminals in the drawing. The numerals 42, 43, 44, 45, represent respectively the neutral terminals of secondaries 16, 17, 18, 19 and the numerals 30' to 41' represent the connection points of the main windings and the corresponding stub windings of these zigzag-wound star-connected secondaries 16, 17, 18 and 19.

The phase terminals 30 to 41 of secondaries 16 to 19 are connected respectively to the anodes 51 to 62 inclusive of the rectifier 12 which fire or start to carry current in the order determined by the sequence of numerals 51 to 62. Each of the anodes 51 to 62 inclusive of the rectifier is provided with a control electrode 51' to 62' respectively upon which a potential is impressed to control the instant during the cycle of the alternating supply potential at which the associated anode will be operable to start carrying current as will be described hereafter. The control electrodes 51', 53', 55', 57', 59' and 61' are severally connected through resistances 46 and 47 with the negative terminal of a source of direct current potential such as the battery 48. An intermediate point of the battery 48 is connected with the cathode 49 and the positive terminals of the battery 48 is connected with the distributor switch 59 comprising a series of contacts 71, 73, 75, 77, 79 and 81 and a brush 64. The brush 64 is mounted on the shaft 65 and preferably rotatably driven by a synchronous motor 67 fed from the alternating current supply line.

The control electrodes 52', 54', 56', 58', 60' and 62' are connected in a similar manner to those previous described, that is through resistances 68 and 69 and a distributor 80 comprising a series of contacts 72, 74, 76, 78, 80 and 82 and a brush 84 with a source of direct current 87 having an intermediate point thereof connected with the cathode 49. The negative terminals of the source of current such as the battery 87 is connected with the contacts of the distributor and the positive terminal of the battery is connected with the brush 84. The latter is on the same shaft as the brush 64 and both are driven by means of the synchronous motor 67 connected to the alternating current line. The contacts 71, 73, 75, 77, 79 and 81 of the distributor 59 and the contacts 72, 74, 76, 78, 80 and 82 of the distributor 80 are connected each to one of the junction points between resistances 46 and 47 and resistances 68 and 69 respectively as shown.

As it is readily understood by those skilled in the art, the brush 64 of the distributor 59 being rotated by the synchonous motor 67 permits sequential energization of control electrodes 51', 53', 55', 57', 59' and 61' from battery 48. The corresponding anodes 51, 53, 55, 57, 59 and 61 therefore sequentially carry current, as is well konwn in the electric current rectifier art. The said anodes 51, 53, 55, 57, 59 and 61 belong to the 6-phase system comprising secondaries 16 and 17. The output of the said 6-phase group may be regulated in a well known manner by shifting the phase of the potentials of the grids 51', 53', 55', 57', 59' and 61' with respect to the phases of the potentials at the anodes 51, 53, 55, 57, 59 and 61, thus delaying the point in each half cycle of positive anode potential at which the anodes are made conducting. This can be readily done by means of the lever 85 which allows to change the position of the stationary part of the distributor relative to the rotary part or brush 64.

In a similar manner, the brush 84 of the distributor 80 being mounted on the same shaft 65 as the brush 64 and rotated by the synchronous motor 64 permits sequential energization of control electrodes 52', 54', 56', 58', 60' and 62' from the battery 87. The corresponding anodes 52, 54, 56, 58, 60 and 62 belong to the 6-phase system comprising secondaries 18 and 19. The output of the 6-phase group may be regulated in a well known manner by shifting the phase of the grid potentials of the grids 52', 54', 56', 58', 60' and 62' with respect to the phases of the potentials at the anodes 52, 54, 56, 58, 60 and 62. In the same manner as previously stated this can be done by shifting the point in each half cycle of positive anode potential at which the anode is made conducting, which is effected by means of the lever 86 changing the position of the stationary part of the distributor 80.

In order to understand the operation of this apparatus it is assumed for instance that the potentials applied to the control electrodes are maintained in phase with their respective anode potentials. Consequently the rectifying system will behave in such a manner as if the control electrodes did not exist at all.

Assuming that at a given time the anodes which are active are those connected to terminals 33, 34, 35 and 36 respectively, then when that anode starts which is next in the firing sequence, i. e. the anode which is connected to terminal 37 of the 6-phase system comprising secondaries 18 and 19, the commutating process adds to the voltage in phase 45—33 half of the difference between the voltage in phase 45—37 and phase 45—33. But since the stub winding portion 33'—33 of phase 45—33 of the 6-phase system comprising secondaries 18 and 19 is in the same direction as the main winding portion 42—34' of phase 42—34 which is in the 6-phase system comprising secondaries 16 and 17, the voltage of phase 42—34 will be raised a corresponding amount if the coupling between the phases is 100% or will be raised a less amount in accordance with the magnetic leakage.

As a result of the above described action the phase voltage of the 6-phase system comprising secondaries 16 and 17 will be increased since the anode connected to phase 42—34 is active. The anode current of the group will also be increased.

Assuming next that the anodes connected to terminals 34, 35, 36 and 37 are active, then when the succeeding anode starts, which is the anode connected to terminals 38 of the 6-phase system comprising secondaries 16 and 17, half of the commutating voltage will be added to phase 42—34. Since the stub portion 34'—34 of phase 42—34 is in the same direction as the main winding 45—33' of phase 45—33 of the 6-phase system comprising secondaries 18 and 19, the voltage of phase 45—33 will be increased. However, since the anode connected to phase 45—33 is idle the direct current output of the 6-phase system comprising secondaries 18 and 19 will not be increased. This is true if the commutation occurs between phase 45—37 and phase 45—33.

A similar analysis can be made, leading to the same conclusion, if commutation occurs between phase 45—37 and phase 45—36, that is if the active anode period is less than 120°. In this case the unbalance will depend on the interphase impedance consisting of interphase transformer 21, reactor 26 and third interphase transformer 22 since the commutating current passes through this interphase impedance. If the latter impedance is in resonance with the main transformer impedance the unbalancing voltage may be larger than the phase voltage between phase 45—37 and phase 45—35.

It will be readily understood from the foregoing analysis that when the alternate groups of anodes connected to the six alternate groups of terminals 33—36, 35—38, 31—34 are active, the direct current output of the 6-phase system comprising secondaries 16 and 17 will be increased, while when the alternate groups of anodes connected to the six alternate groups of terminals 34—37, 36—39, 32—35 are active the direct current output of the 6-phase system comprising secondaries 18 and 19 is not increased. The net result of the commutating action is to increase the direct current output from the 6-phase system comprising secondaries 16 and 17 over that from the 6-phase system comprising secondaries 18 and 19, thus causing unbalance as hereinbefore stated in the output from the two 6-phase systems. It is to be noted that if the third interphase transformer 23 is not provided with an air gap this transformer will be saturated in accordance with the excess direct current and such saturation will tend to accentuate the unbalance in the output current in the two 6-phase systems.

From the foregoing it follows that reversal of direction of phase rotation of the primary or input alternating current results in shifting the preponderance of load from one 6-phase system to the other.

In order to prevent unbalancing of the two 6-phase systems constituting the 12-phase system shown in Fig. 1 means is provided in accordance with the present invention for displacing the relative phase position of the voltages applied upon the control electrodes 51', 53', 55', 57', 59', and 61' with respect to the voltages applied upon the control voltages 52', 54', 56', 58', 60' and 62'.

When the phase rotation of main transformer 13 is such that the output of the 6-phase group including secondaries 16 and 17 tends to become greater than that from the 6-phase group including secondaries 18 and 19 the undue rise of current in the former group will be prevented by displacing the stationary part of the distributor 59 with respect to the stationary part of 80.

Figure 2:
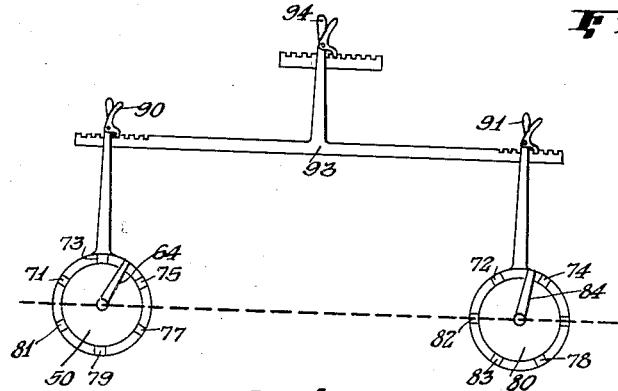
Figure 2 shows an improved control device for use in a system according to Figure 1.

Fig. 2 indicates a modification of my invention. The stationary parts of the rotary distributors 60 and 80 are provided with handles 90 and 91 respectively. The handles 90 and 91 are connected one to another by means of a connecting member or rod 93. The latter can be displaced horizontally by means of the handle 94 and as it is well understood by those skilled in the art by shifting the handle 94 the stationary parts of the rotary distributors 59 and 80 are displaced simultaneously and the voltage conditions in each of the 6-phase groups of the 12-phase rectifier affected in similar manner. Consequently the handle 94 is used to regulate the voltage at the D. C. terminals of the 12-phase rectifier. On the other hand by displacing the handle 90 or the handle 91 the relative amount of load taken by each of the 6-phase groups of the 12-phase rectifier may be regulated.

From the above it follows that any unbalancing of the two systems can be easily corrected by the adjustment of the distributors as described either manually or automatically. In the latter case all that is necessary is to provide a differential relay or similar device energized by currents derived from and varying in accordance with the load currents passed through the two systems. The relay controls a servo-motor in a known manner which in turn serves to operate the adjusting lever 94. As soon as unbalance occurs due to changed load conditions, the relay responds due to the current differential affecting same and the servo-motor readjusts the distributors and phasing of the grid potentials until the original balanced condition is restored.

While the invention has been described with specific reference to the embodiments shown in the drawing, it will be evident from the above that many changes and variations may be made differing from the details of construction and arrangement presented herein for illustration, in accordance with the broad scope and spirit of the invention as defined in the ensuing claims.

I claim:

1. In an alternating current-direct current translating system, the combination of a main transformer apparatus, two polyphase systems each provided with secondary windings comprised in said transformer apparatus and with interphase connections between the neutral terminals of said windings, an electric discharge device having a plurality of anodes with associated control electrodes and a cathode, a direct current circuit connected to said interphase connection and to said windings through said discharge device, a source of potential for each polyphase system and associated group of anodes and control electrodes, a distributor for each polyphase system, each distributor having a stationary member with a plurality of contacts connected to the associated control electrodes, and a rotating member operated in synchronism with the alternating current and connected to the respective source of potential of the associated polyphase system, said distributors adapted to sequentially energize the associated control electrodes by the respective source of potential, and independent means for adjusting the relative position of the stationary members of said distributors.

2. In an alternating current-direct current translating system, the combination of a main transformer apparatus, two polyphase systems each provided with secondary windings comprised in said transformer apparatus and with an interphase connection between the neutral terminals of said windings, an electric discharge device having a plurality of anodes with associated control electrodes and a cathode, a direct current circuit connected to said interphase connection and to said windings through said discharge device, a source of potential for each polyphase system and associated groups of anodes and control electrodes, a distributor for each polyphase system, each distributor having a stationary member with a plurality of contacts connected to the associated control electrodes and a rotating member operated in synchronism with the alternating current and connected to the respective source of potential of the associated polyphase system, said distributors adapted to sequentially energize the associated control electrodes by the respective source of potential, and means to prevent unbalance between the loads in said two polyphase systems, said means being adapted to change the position of at least one of the stationary members of the said distributors independently of the other distributor, whereby the load in the associated system may be adjusted to be equal to the load in the other polyphase system.

3. In an alternating current-direct current translating system, the combination of main transformer apparatus, two 6-phase systems each provided with two 3-phase secondary windings comprised in said transformer apparatus and with an interphase connection including a reactor connected between the neutral terminals of said windings, an electric discharge apparatus having a plurality of anodes with associated control electrodes and a cathode, a direct current circuit connected to said interphase connection and to said windings through said discharge device, a source of potential for each 6-phase system and associated groups of anodes and control electrodes, a distributor for each 6-phase system, each distributor having a stationary member with a plurality of contacts connected to the associated control electrodes and a rotating member operated in synchronism with the alternating current and connected to the respective source of potential of the associated 6-phase system, said distributors adapted to sequentially energize the associated control electrodes by the respective source of potential, and means to prevent unbalance between the loads in said two 6-phase systems, said means being adapted to change the position of at least one of the stationary members of said distributors independently of said other distributor.

4. In an alternating current-direct current translating system, the combination of main transformer apparatus, two 6-phase systems each provided with two 3-phase secondary windings comprised in said transformer apparatus and with an interphase connection including a condenser and a reactor connected between the neutral terminals of said windings, an electric discharge apparatus having a plurality of anodes with associated control electrodes and a cathode, a direct current circuit connected to said interphase connection and to said windings through said discharge device, a source of potential for each 6-phase system and associated groups of anodes and control electrodes, a distributor for each 6-phase system, each distributor having a stationary member with a plurality of contacts connected to the associated control electrodes and a rotating member operated in synchronism with the alternating current and connected to the respective source of potential of the associate 6-phase system, said distributor adapted to sequentially energize the associated control electrodes by the respective source of potential and means to prevent unbalance between the loads in said two 6-phase systems, said means being adapted to change the position of the stationary member of at least one of said distributors independently of the other distributor in a manner to equalize the load in the said two 6-phase systems.

5. In an alternating current-direct current translating system, the combination of a main transformer apparatus, two polyphase systems each provided with secondary windings comprised in said transformer apparatus, the said polyphase systems being maintained under substantially equal load conditions, an interphase connection between the neutral terminals of said windings, an electric discharge device having a plurality of anodes with associated control electrodes and a cathode, a direct current circuit connected to said interphase connection and to said windings through said discharge device, a source of potential for each polyphase system and associated group of anodes and control electrodes, a distributor for each polyphase system, each distributor having a stationary member with a plurality of contacts connected to the associated control electrodes, and a rotating member, common drive means for both rotating members of said distributors, for operating said distributor in equal phase position and in synchronism with the alternating current, and control means for independently and simultaneously adjusting the position of the stationary members of said distributors.

JACOB NEUFELD.